United States Patent
Bent et al.

(10) Patent No.: US 10,359,941 B1
(45) Date of Patent: Jul. 23, 2019

(54) MULTI-TIER DATA STORAGE USING BURST BUFFER APPLIANCE FOR WORKLOAD TRANSFORMATION BASED ON PERFORMANCE CHARACTERISTICS OF AT LEAST ONE TIER

(71) Applicant: EMC Corporation, Hopkinton, MA (US)

(72) Inventors: John M. Bent, Los Alamos, NM (US); Sorin Faibish, Newton, MA (US); James M. Pedone, Jr., West Boylston, MA (US); James J. Moore, Los Angeles, CA (US); Dennis P. J. Ting, Groton, MA (US)

(73) Assignee: EMC Corporation, Hopkinton, MA (US)

( * ) Notice: Subject to any disclaimer, the term of this patent is extended or adjusted under 35 U.S.C. 154(b) by 187 days.

(21) Appl. No.: 14/579,351

(22) Filed: Dec. 22, 2014

(51) Int. Cl.
*G06F 3/06* (2006.01)

(52) U.S. Cl.
CPC ............ *G06F 3/061* (2013.01); *G06F 3/0619* (2013.01); *G06F 3/0641* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 6,301,640 | B2* | 10/2001 | Barve | G06F 3/0613 |
| | | | | 711/113 |
| 2009/0106255 | A1* | 4/2009 | Lacapra | G06F 11/1076 |
| 2010/0332401 | A1* | 12/2010 | Prahlad | G06F 17/3002 |
| | | | | 705/80 |
| 2013/0086301 | A1* | 4/2013 | Cleveland | G06F 3/0689 |
| | | | | 711/103 |
| 2013/0227194 | A1 | 8/2013 | Kannan et al. | |
| 2014/0298079 | A1* | 10/2014 | Dean | G06F 12/0246 |
| | | | | 714/4.5 |
| 2014/0351300 | A1 | 11/2014 | Uppu et al. | |
| 2015/0370716 | A1* | 12/2015 | Patel | G06F 3/0608 |
| | | | | 711/113 |

* cited by examiner

*Primary Examiner* — Edward J Dudek, Jr.
*Assistant Examiner* — Ralph A Verderamo, III
(74) *Attorney, Agent, or Firm* — Ryan, Mason & Lewis, LLP (57) ABSTRACT

Improved multi-tier storage techniques are provided for storing data, such as checkpoints or other bursty data, in parallel computing environments. A burst buffer appliance is provided for use in a first storage tier of a multi-tier storage system comprising at least the first storage tier and a second storage tier. The exemplary burst buffer appliance comprises a memory for storing data; and at least one processing device to transform at least a portion of the data for storage on the second storage tier based on one or more performance characteristics of the second storage tier. In at least one embodiment, the at least one processing device is further configured to perform at least one function on the at least the portion of the data on behalf of the second storage tier. The performance characteristics of the second storage tier comprise, for example, a stripe size and/or network topology information.

20 Claims, 8 Drawing Sheets

```
// PLFS code for two-tier read
two_tier_read(obj id, buffer, offset, length) {
  // first get the metadata. Construct it if not already known
  metadata = metadata_cache[id];
    if (metadata == NULL) {
       metadata = plfs_get_metadata(id)
    }
  // check the metadata to discover where data is
  // if data is not in BB, enlist sibling BBs to collectively fetch it
  if (! data_is_cached(metadata)) {
    bb_broadcast(FETCH,id);
    // a synchronous collective FETCH operation is assumed
// can be optimized by moving code to open call instead of read.
  }
  // the data is now striped across the BB's
  // data was just fetched or it was already here
  // optimize by threading this.
  foreach stripe in region(offset,length) {
    if (stripe.local()) {
      perf_tier_read(/* put the stripe into the buffer */);
    } else {
      // request missing stripe from appropriate sibling
      bb_fetch(stripe.owner,stripe);
    }
  }
  return;
}
```

FIG. 4

```
// PLFS code for two-tier write
two_tier_write(buf,len,offset) {
  // first get the metadata. Construct it if not already known
    metadata = metadata cache[id];
    assert(metadata);
    // it will be cached if doing writes
    perf_tier->write(buf,len,offset);
    metadata.update(len,offset);
}
// on the close, if there is dirty data, flush it
two_tier_close() {
  // first get the metadata. Construct it if not already known
    metadata = metadata_cache[id];
  assert(metadata);
  // it will be cached if we at the close
    if (metadata.dirty()) {
       // for ref count, broadcast to ask which siblings have object open.
       ref_count = bb_broadcast(REF_COUNT,id);
    if (ref_count == 0) {
      bb_broadcast(FLUSH, id);
    }
  }
 }
}
```

*FIG. 5A*

```
                                                                    ┌500
// code executed on every BB in response to a broadcast of a FLUSH operation
// code allows a simple object tier to replace a parallel file system
// since bb software controls all IO and makes it well-behaved and conducive
// to the object tier
two_tier_flush(id) {
    // first get the metadata. Construct it if not already known
    metadata = metadata_cache[id];
    if (metadata == NULL){
        metadata = plfs_get_metadata(id)
    }
    // each BB knows total number of BB siblings, its rank within them, total size
    // of object in capacity tier and performance characteristics of capacity tier
    // (referred to as the oracle) for example, good stripe size to request and network
    // topology information mapping particular BB's to particular stripes.
    set<stripe> stripes = oracle->my_stripes(id,metadata);.
```

FIG. 5B

```
// now write each stripe
// some object tiers do not allow good parallel access to
// shared objects. Most do but only when the stripes are aligned.
// For instances in which object tier does not allow this, store each "stripe"
// into a separate object. Then, metadata will include this stripe->object mapping.
// optimization to stripe this
foreach stripe (stripes) {
    // the stripe to be written might not be locally resident. Parts might be on sibling BB's.
    // so use two-tier read call to get the stripe
    buf = malloc(stripe.size);
    two_tier_read(id,stripe.offset,stripe.length);
    augmented_metadata=augment_metadata(id,stripe)
    capacity_tier->write(buf,stripe.offset,stripe.length,augmented_metadata);
}
return;
}
```

```
// some capacity tiers might have mechanisms by which to give them more assistance
// One example is erasure codes. The capacity tier will compute erasure codes for each stripe.
// since already aggregating and aligning the stripes, erasure can also be computed
augment_metadata(id,stripe) {
    // capacity tier specific things go here
    // for exemplary vipr, compute erasure code and then give erasure code to vipr
    // so that it doesn't have to compute it itself
    // build data filters and data indices and other augmented metadata
    // some of this, such as provenance, could be supplied at the open() call by the application or at
    // initialization time by resource manager
}
```

```
// following code is executed on every BB in response to a broadcast of a FETCH operation
// code allows a simple object tier to replace a parallel file system
// because bb software controls all IO and makes it well-behaved and conducive
// to the object tier
two_tier_fetch(id) {
    // first get metadata. Construct it if not already known
    metadata = metadata_cache[id];
    if (metadata == NULL) {
        metadata = plfs_get_metadata(id)
    }

// each BB knows total number of BB siblings, its rank within them, total size
    // of object in capacity tier and performance characteristics of capacity tier
    // (referred to as the oracle) for example, good stripe size to request and
    // network topology information mapping particular BB's to particular stripes.
    set<stripe> stripes = oracle->my_stripes(id,metadata);
    // now read and cache each stripe
    // some object tiers do not allow good parallel access to
    // shared objects. Most do but only when the stripes are aligned.
    // For instances in which object tier does not allow this, store each "stripe"
    // into a separate object. Then, metadata will include this stripe->object mapping.
    foreach stripe (stripes) {
        buf = malloc(stripe.length)
        capacity_tier->read(buf,stripe.offset,stripe.length);
        perf_tier_write(buf,stripe.offset,stripe.length);
    }
}
```

700

MULTI-TIER DATA STORAGE USING BURST BUFFER APPLIANCE FOR WORKLOAD TRANSFORMATION BASED ON PERFORMANCE CHARACTERISTICS OF AT LEAST ONE TIER

FIELD

The invention relates generally to data storage, and more particularly to storage of bursty data, such as checkpoints, in parallel computing systems.

BACKGROUND

Parallel computing techniques are used in many industries and applications for implementing computationally intensive models or simulations. In many parallel computing applications, a group of distributed processes often generate bursty data, such as checkpoint data that protects the distributed processes in the event of a failure. Checkpointing is a difficult workload for the storage system since each process simultaneously writes data to the storage system. Checkpoints thus create a bursty period of input/output (JO) in which the storage system is mostly idle except for infrequent periods of IO in which the bandwidth of the entire storage system is saturated and the expensive distributed processes in compute nodes are idle. Checkpoints often result in wasted resources since the storage system must be extremely powerful while remaining substantially idle between checkpoint phases.

It is desirable for storage systems to provide a minimum amount of capacity to store required data, such as checkpoint data, while also requiring a minimum amount of bandwidth to perform each storage operation quickly enough so that the expensive processors in the compute nodes are not idle for excessive periods of time. A need therefore exists for improved storage techniques in parallel computing environments.

SUMMARY

Illustrative embodiments of the present invention provide improved multi-tier storage techniques for storing data, such as checkpoints or other bursty data, in parallel computing environments. In one embodiment, a burst buffer appliance is provided for use in a first storage tier of a multi-tier storage system comprising at least the first storage tier and a second storage tier.

The exemplary burst buffer appliance comprises a memory for storing data; and at least one processing device to transform at least a portion of the data for storage on the second storage tier based on one or more performance characteristics of the second storage tier. In at least one embodiment, the at least one processing device is further configured to perform at least one function on the at least the portion of the data on behalf of the second storage tier.

The performance characteristics of the second storage tier comprise, for example, a stripe size and/or network topology information. The performance characteristics of the second storage tier can be obtained from an open( ) call by a distributed application or at an initialization time from a resource manager.

In another embodiment, a burst buffer appliance in a first storage tier of a multi-tier storage system obtains data in the multi-tier storage system, wherein the multi-tier parallel computing system comprises at least the first storage tier and a second storage tier for storing the data; and transforms at least a portion of the data for storage on the second storage tier using at least one processing device based on one or more performance characteristics of the second storage tier.

As noted above, illustrative embodiments described herein provide significant improvements relative to conventional storage arrangements. In some of these embodiments, use of a burst buffer appliance in a multi-tier storage environment to transform a storage workload during a checkpoint or other storage operation based on performance characteristics of at least one tier allows additional storage technologies to be employed in the multi-tier storage system than would otherwise be possible.

DETAILED DESCRIPTION

Illustrative embodiments of the present invention will be described herein with reference to the storage of data, such as bursty data, generated by an exemplary parallel computing system and associated clients, servers, storage arrays and other processing and storage devices. It is to be appreciated, however, that the invention is not restricted to use with the particular illustrative parallel computing system and device configurations shown. Accordingly, the terms "parallel computing system" and "parallel file system" as used herein are intended to be broadly construed, so as to encompass, for example, distributed computing systems and other types of computing systems and related storage implemented by using one or more processing or storage devices. While the invention is illustrated herein primarily in the context of the storage of bursty data, such as checkpoint data, the present invention can be applied to the storage of any data, as would be apparent to a person of ordinary skill in the art. As used herein, the term "bursty data" comprises any multi-phase input/output (JO) task with alternating periods of idle time and bursts of write and/or storage activity.

In one exemplary embodiment, a two-tier storage system comprises a first performance tier that employs memory based on performance considerations (e.g., access times) and a second capacity tier that employs storage based on capacity considerations. In this manner, the two-tier storage system balances between the relative costs of memory and other storage and their relative speeds. It is to be appreciated that more than two storage tiers may be used in other embodiments.

An exemplary aspect of the invention employs a two-tier storage system having one or more burst buffer appliances in the performance tier to transform a storage workload during a checkpoint, migration or other storage operation (e.g., read and write operations) based on performance characteristics of the capacity tier. Generally, the transformation is performed to allow the capacity tier to store data that it would otherwise be unable to store due to a performance limitation.

The exemplary performance characteristics of the capacity tier may comprise, for example, a stripe size that should be requested for storage operations and optionally network topology information that maps particular burst buffer appliances to particular stripes. Generally, the performance characteristics of the capacity tier allow the burst buffer appliances of the performance tier to reorganize the input-output workload into better aligned network streams for high throughput data movement across the storage tiers. For example, the performance tier can transform complex interleaved distributed write patterns into well-aligned input-output operations to one or more objects in the capacity tier.

The exemplary performance characteristics of the capacity tier may be obtained, for example, at an open( ) call by a distributed application or at an initialization time by a resource manager.

According to a further aspect of the invention, the burst buffer appliances optionally also provide additional functionality to perform one or more functions normally performed by the capacity tier. For example, in an exemplary embodiment, the burst buffer appliances compute erasure codes on behalf of the capacity tier for storage with the data. In further variations, the burst buffer appliances compute augmented metadata with additional data services, such as data content indexing, data deduplication and data parity.

The exemplary performance tier comprises the burst buffer appliance that transforms a storage workload based on performance characteristics (e.g., performance limitations) of the capacity tier. The burst buffer appliance in the exemplary embodiments is assumed to comprise a flash memory, such as a DSSD™ flash storage system, commercially available from EMC Corp., or other high-speed memory having a substantially lower access time than the capacity tier. Although flash memory will often be used for the high-speed memory of the burst buffer appliance, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes and a file system such as the capacity storage tier, for storing data associated with different types of IO operations.

The exemplary capacity tier may be implemented, for example, using a Distributed Application Object Storage (DAOS) Object Store, commercially available from Intel Corp.; a multi disk storage tier, such as an Isilon™ storage array, commercially available from EMC Corp.; or ViPR™, a software-defined Storage as a Service key-value storage product, commercially available from EMC Corp. (ViPR abstracts storage from disparate arrays into a single pool of storage capacity).

While the present invention is illustrated herein using multiple storage tiers comprised of a plurality of exemplary storage technologies, such as flash storage, other storage technologies can be employed in each tier, as would be apparent to a person of ordinary skill in the art. In addition, while the present invention is illustrated herein using multiple storage tiers to store a checkpoint, as noted above, the present invention also applies to the storage of other data, such as other bursty IO tasks, as would be apparent to a person of ordinary skill in the art.

Figure 1:
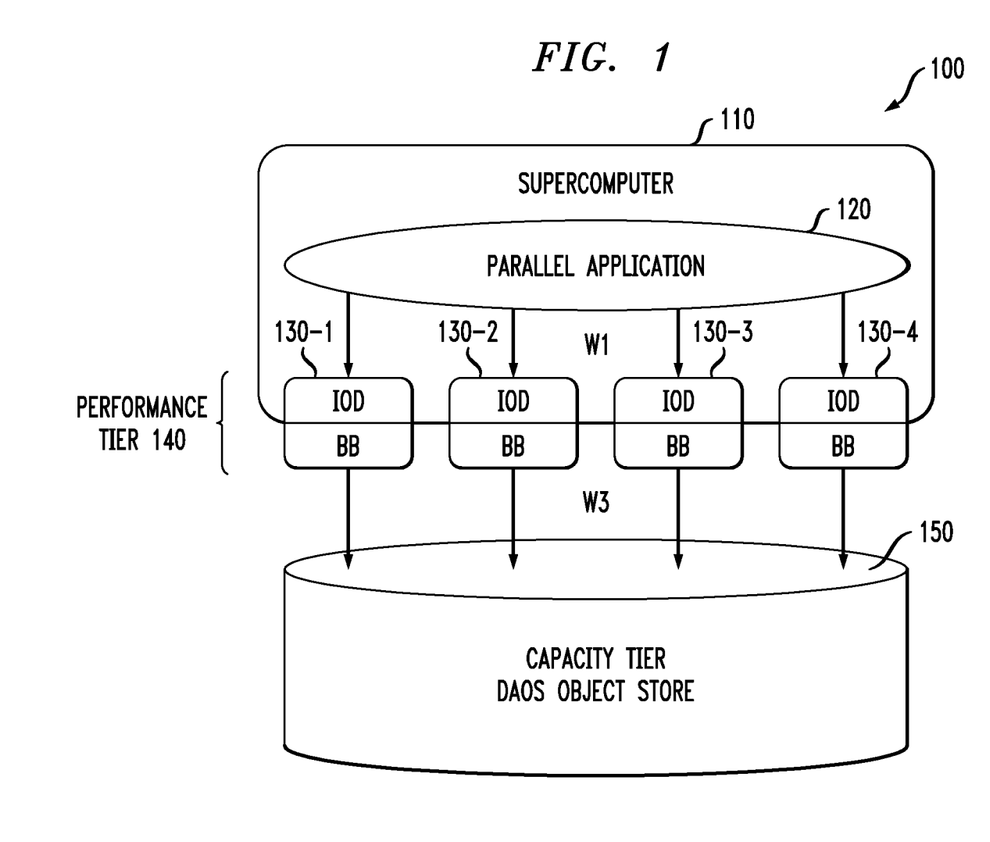
FIG. 1 illustrates an exemplary input-output architecture for a parallel computing system configured in accordance with an illustrative embodiment of the present invention.

FIG. 1 illustrates an exemplary input-output architecture 100 for a parallel computing system configured in accordance with an illustrative embodiment of the present invention. As shown in FIG. 1, the exemplary input-output architecture 100 comprises a parallel application 120 executing on a supercomputer 110, typically comprised of a plurality of compute nodes (not shown in FIG. 1). The parallel application 120 generates a storage workload W1 that is processed by a plurality of burst buffer (BB) appliances 130-1 through 130-4 that each execute input-output dispatcher (IOD) software.

The storage workload W1 or portions thereof can be stored by each burst buffer appliance 130 in a performance tier 140 comprised of flash memory associated with the corresponding burst buffer appliance 130 and/or in the capacity tier 150, in accordance with aspects of the invention. The exemplary capacity tier 150 is implemented as an exemplary DAOS Object Store. As previously indicated, each burst buffer appliance 130-1 through 130-4 processes and transforms the storage workload W1 based on performance characteristics of the capacity tier 150 to generate a transformed storage workload W3 that is stored on the capacity tier 150.

Figure 2:
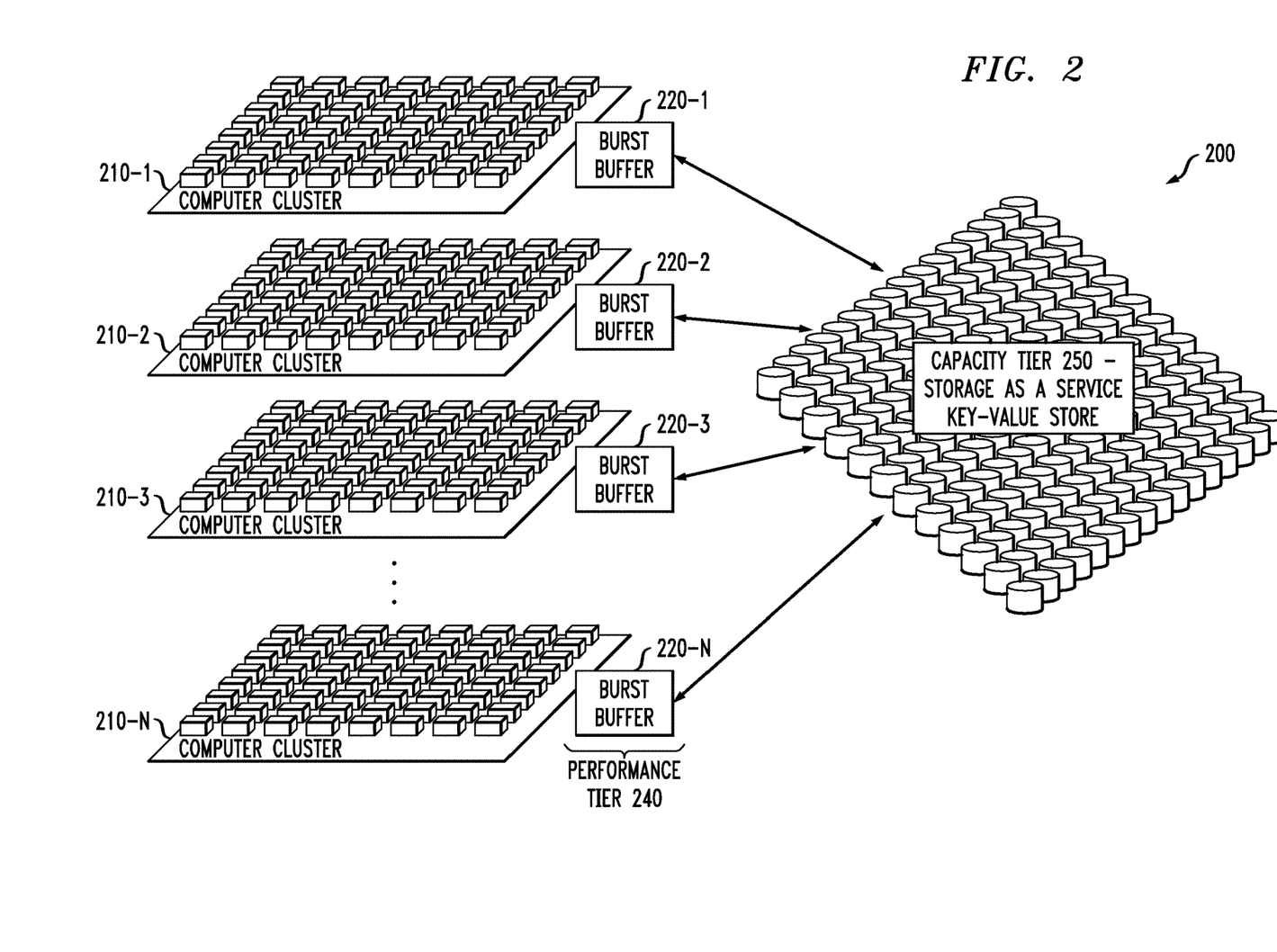
FIG. 2 illustrates an exemplary embodiment of the parallel computing system of FIG. 1.

FIG. 2 illustrates an exemplary implementation 200 of the input-output architecture 100 of FIG. 1. As shown in FIG. 2, the supercomputer 110 of FIG. 1 is implemented as a plurality of compute clusters 210-1 through 210-N, each comprised of a plurality of compute nodes. Each compute cluster 210 has an associated burst buffer appliance 220-1 through 220-N, for example, associated with one or more input-output nodes (ION) of the respective compute cluster 210. The exemplary performance tier 240 is implemented using the flash storage of the buffer appliances 220-1 through 220-N, such as a DSSD™ flash storage system, commercially available from EMC Corp. The exemplary capacity tier 250 is implemented using ViPR™, a software-defined Storage as a Service key-value store, commercially available from EMC Corp. The different storage tiers 240 and 250 in this embodiment comprise different types of storage devices having different performance characteristics, and the two exemplary storage technologies may be varied in other embodiments.

The exemplary flash storage devices of the exemplary performance tier 240 are generally significantly faster in terms of read and write access times and generally otherwise perform better than the storage devices of the capacity tier 250, which typically provide greater overall capacity than the exemplary performance tier 240. Thus, the flash storage devices of the performance tier 240 generally provide higher performance than the storage devices of the capacity tier 250, but the storage devices of the capacity tier 250 generally provide higher capacity at lower cost than the flash storage devices. These storage tiers comprise respective disjoint subsets of storage. However, numerous alternative tiering arrangements may be used, including three or more tiers each providing a different level of performance. The particular storage devices used in a given storage tier may be varied in other embodiments and multiple distinct storage device types may be used within a single storage tier.

The exemplary tiering arrangement of FIG. 2 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the parallel computing system of FIGS. 1 and 2, leading to enhanced system performance relative to conventional arrangements, while additionally or alternatively providing an ability to achieve particular levels of performance at lower cost.

Each burst buffer appliance 220 in the present embodiment is assumed to comprise a flash memory or other high-speed memory having a substantially lower access time than the capacity tier 250. The burst buffer appliance 220 may optionally comprise an analytics engine, and may include other components. Thus, each exemplary burst buffer appliance 220 comprises a portion of the storage (for example, flash memory) for the performance tier 240.

Each burst buffer appliance 220 further comprises a processor coupled to a memory (not shown). The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code.

The processing circuitry of each burst buffer appliance 220 transforms a storage workload based on performance characteristics (e.g., performance limitations) of the capacity tier 250, in accordance with aspects of the invention. The processing system implements pseudo code discussed further below in conjunction with FIGS. 3 through 7.

In addition, each burst buffer appliance 220 further comprises a parallel log structured file system (PLFS), based on, for example, the teachings of John Bent et al., "PLFS: A Checkpoint Filesystem for Parallel Applications," Intl Conf. for High Performance Computing, Networking, Storage and Analysis 2009 (SC09) (November 2009), incorporated by reference herein.

Each burst buffer appliance 220 may be implemented at least in part in the form of software that is stored in the memory and executed by the processor. Each burst buffer appliance 220 comprising a processor, a memory and network interface components as described above is an example of what is more generally referred to herein as a "processing device." Each of the devices described herein may similarly be implemented as a processing device comprising a processor, a memory and network interface components.

One or more burst buffer appliances 220-1 through 220-N are optionally configured to control movement of data between the storage devices of the performance and capacity tiers 240 and 250. Examples of such movement will be described below.

As noted above, although flash memory will often be used for the high-speed memory of each burst buffer appliance 220, other types of low-latency memory could be used instead of flash memory. It should be noted with regard to the illustrative embodiments of FIGS. 1 and 2 that modifications may be made to one or more applications, processes or other system elements or components in order to achieve additional improvements. For example, a job scheduler or other similar component within the system 100 or 200 can also be modified so as to take full advantage of the improved storage tiering functionality.

Storage Operations in the Two-Tier Storage System

In one exemplary implementation, there are four main read( ) functions in the stack. In other words, a single read operation is processed as up to four sub-read operations. When the client on the compute node issues a read operation, the read operation is forwarded by an IO forwarding client on the compute node to an IO forwarding server running on the burst buffer appliance 220. The read operation on the burst buffer appliance 220 is made by the IO forwarding server on the burst buffer appliance 220 to the PLFS code stored therein.

When the data is stored in the performance tier 240 (i.e., in the local burst buffer appliance 220 or a sibling thereof), the PLFS code will issue a read operation on the flash storage of the appropriate burst buffer appliance 220. When the data is not stored in the performance tier, the PLFS code will issue a read operation on the capacity tier 250 to the exemplary ViPR™ key-value store. In one exemplary embodiment, read operations for data elements stored on the capacity tier 250 are done collectively to ensure simple workloads for the capacity tier 250. Write operations are treated in a similar manner as read operations, except that write operations do not go directly to the capacity tier 250. Write operations initially go to the burst buffer appliance 220 of the performance tier 240. Data will be written from the performance tier 240 to the capacity tier 250 when the data is flushed.

Figure 3:
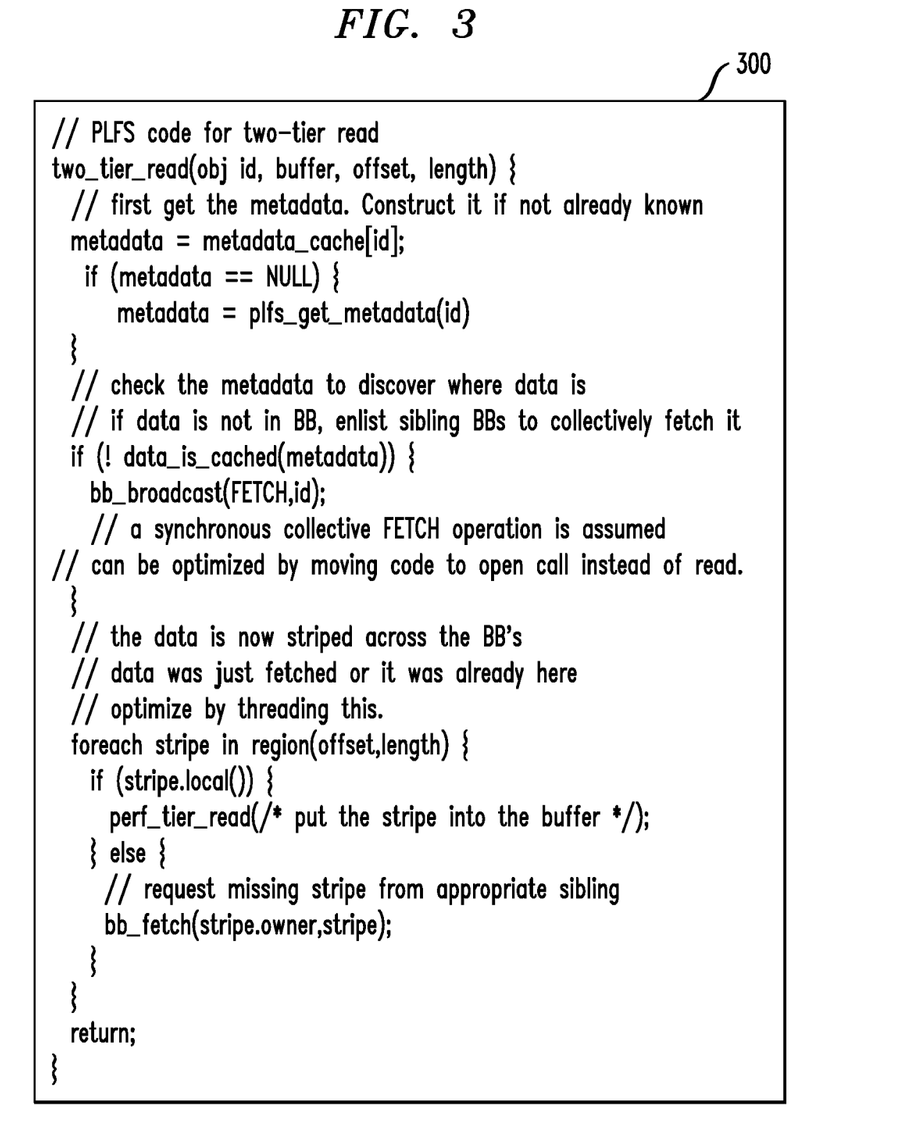
FIGS. 3 through 7, collectively, illustrate exemplary pseudo code for a number of two-tier storage operations incorporating aspects of the present invention.

FIG. 3 illustrates exemplary pseudo code 300 for a two-tier read operation in accordance with the present invention. As shown in FIG. 3, the exemplary pseudo code 300 initially obtains the metadata (constructing the metadata, if necessary). The metadata is then evaluated by the exemplary pseudo code 300 to determine where the data is stored (e.g., on the performance tier 240 or capacity tier 250). If the data is not stored in the current burst buffer appliance 220, then then current burst buffer appliance 220 enlists the sibling burst buffer appliances 220 to fetch the data. The fetch operation is discussed further below in conjunction with FIG. 7.

Once the data has been fetched (or was already present in the current burst buffer appliance 220), the data is striped across the burst buffer appliances 220. For each stripe, if the stripe is already local, the stripe is placed in the buffer in the performance tier 240. Otherwise, the missing stripe is requested from the appropriate sibling burst buffer appliance 220.

Figure 4:
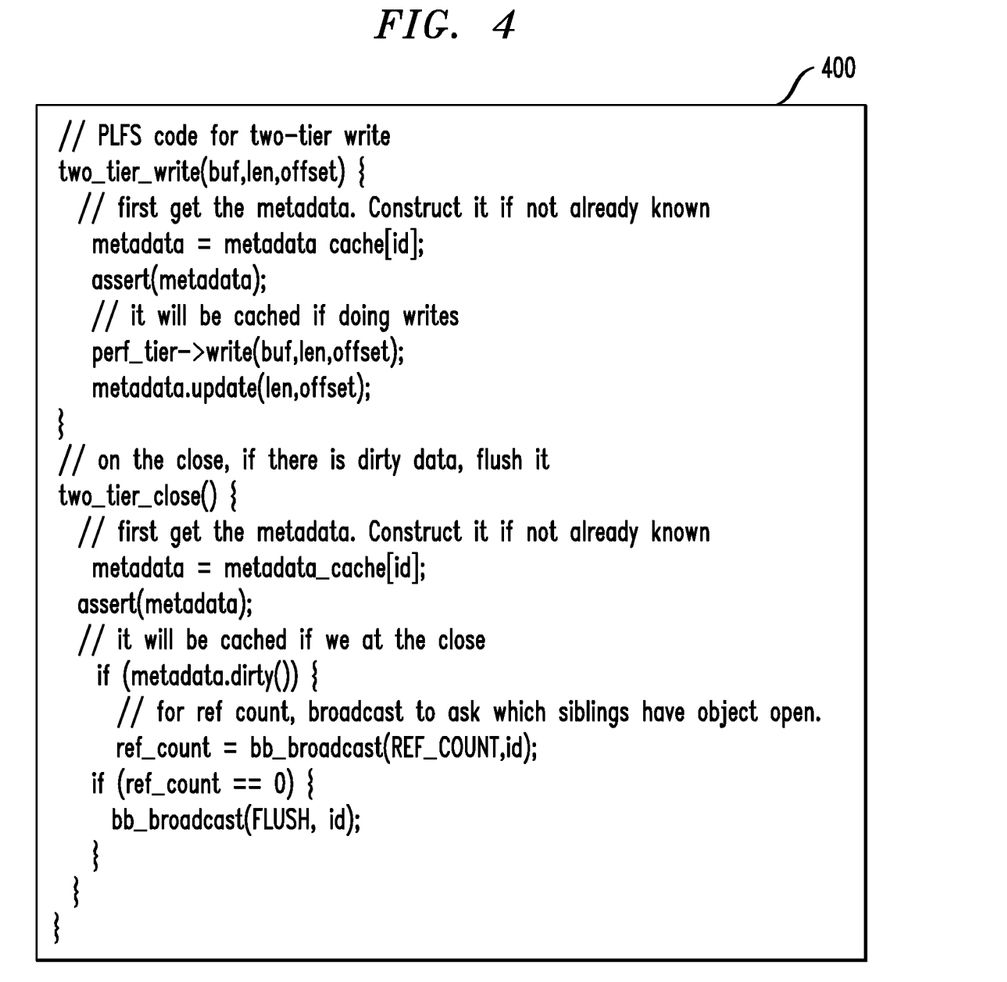

FIG. 4 illustrates exemplary pseudo code 400 for a two-tier write operation and a close operation in accordance with the present invention. As shown in FIG. 4, the exemplary pseudo code 400 initially obtains the metadata (constructing the metadata, if necessary). The metadata will be cached in the performance tier 240 for the write operation. If there is dirty data on the close operation, the dirty data is flushed. The metadata will be cached in the performance tier 240 for the close operation. The current burst buffer appliance 220 broadcasts to the sibling burst buffer appliances 220 to determine the reference count (i.e., whether a sibling has the object open).

Figure 5A:
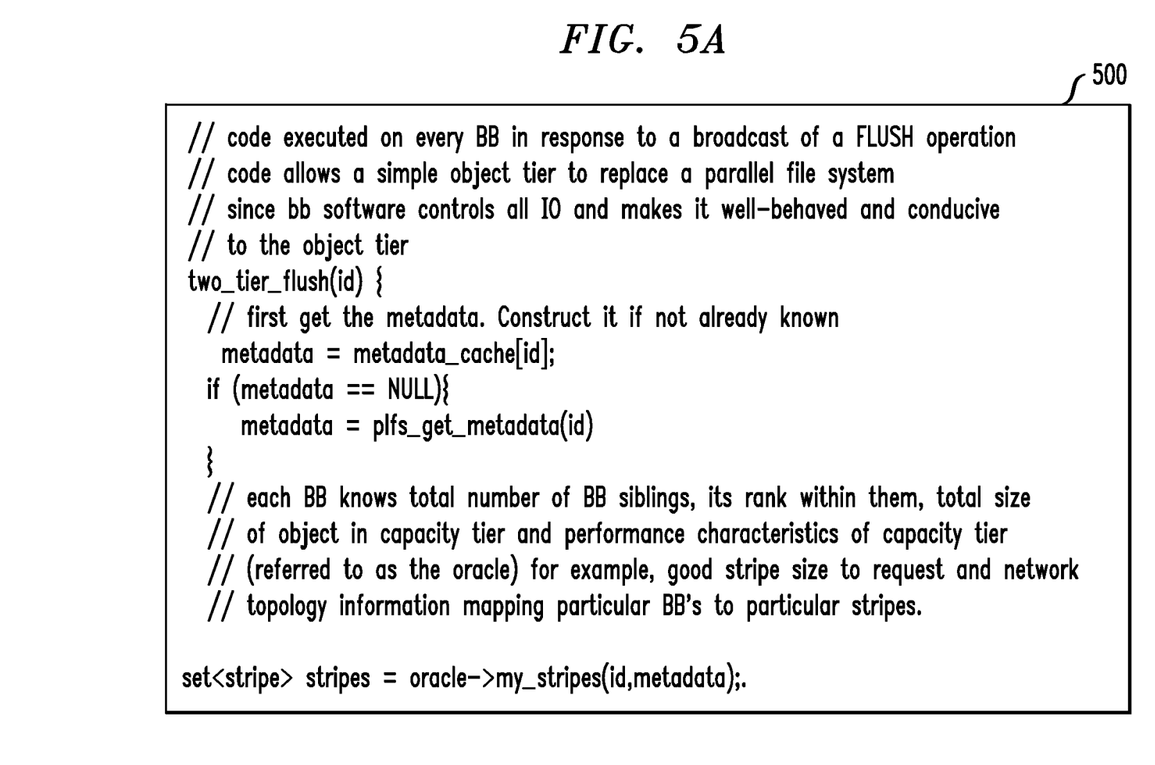
Figure 5B:
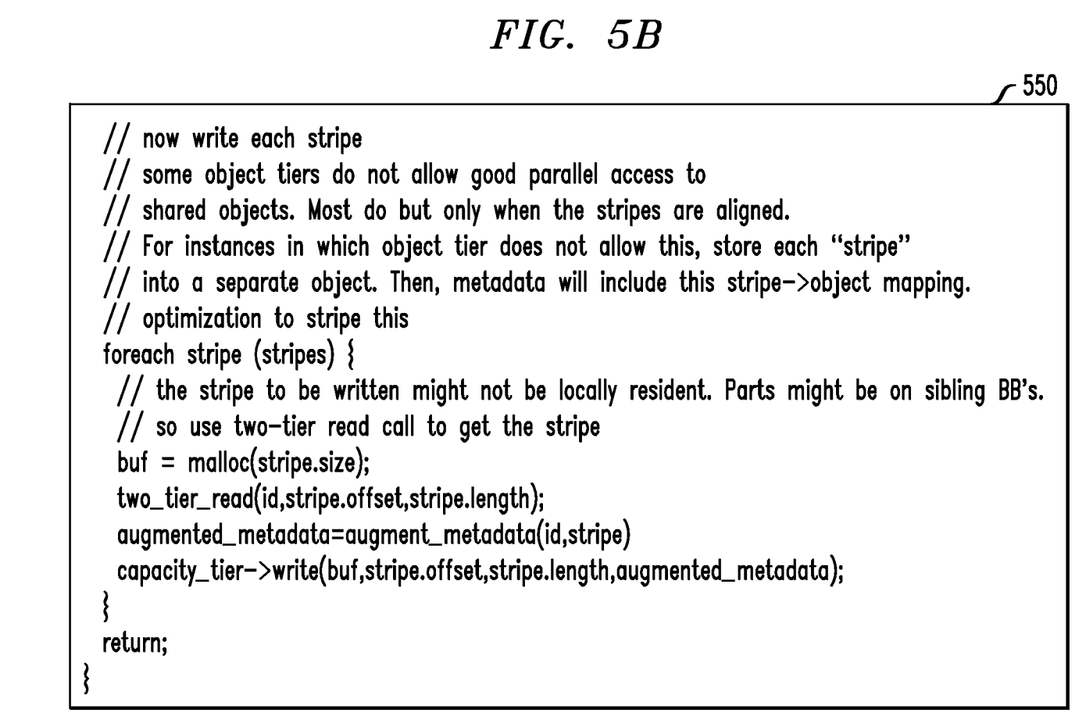

FIGS. 5A and 5B, collectively, illustrate exemplary pseudo code 500, 550 for an exemplary flush operation in accordance with the present invention. As shown in FIG. 5A, the exemplary pseudo code 500 is executed on every burst buffer appliance 220 in response to a broadcast of a flush operation to flush the data to the capacity tier 250. The exemplary pseudo code 500 allows a capacity tier 250 embodied as an object tier to replace a parallel file system, since the software executed by the burst buffer appliances 220 controls the input-output operations and makes the workload W3 well-behaved and conducive to the capacity tier 250.

As shown in FIG. 5A, the exemplary pseudo code 500 initially obtains the metadata (constructing the metadata, if necessary). Each burst buffer appliance 220 knows the total number of sibling burst buffer appliances 220, its own rank within them, the total size of the object in the capacity tier 250, as well as the performance characteristics of the capacity tier 250, referred to herein as the oracle of the capacity tier 250. For example, the oracle of the capacity tier 250 may indicate a good stripe size to request and network topology information that maps particular burst buffer appliances 220 to particular stripes.

As shown in FIG. 5B, the exemplary pseudo code 550 writes each stripe using the oracle information. It is noted that some object tiers do not allow good parallel access to shared objects, although most object tiers do allow good parallel access to shared objects when the stripes are aligned. For instances in which the object tier does not allow this, each "stripe" is stored by the exemplary pseudo code 550 into a separate object. Then, the metadata is updated to include this stripe→object mapping.

If the stripe to be written is not locally resident, the current burst buffer appliance 220 obtains the necessary portions from the appropriate sibling burst buffer appliance(s) 220 using the two-tier read operation of FIG. 3 to obtain the complete stripe. The augment_metadata function that computes augmented metadata is discussed further below in conjunction with FIG. 6. The stripe and associated augmented metadata is then written to the capacity tier 250.

Figure 6:
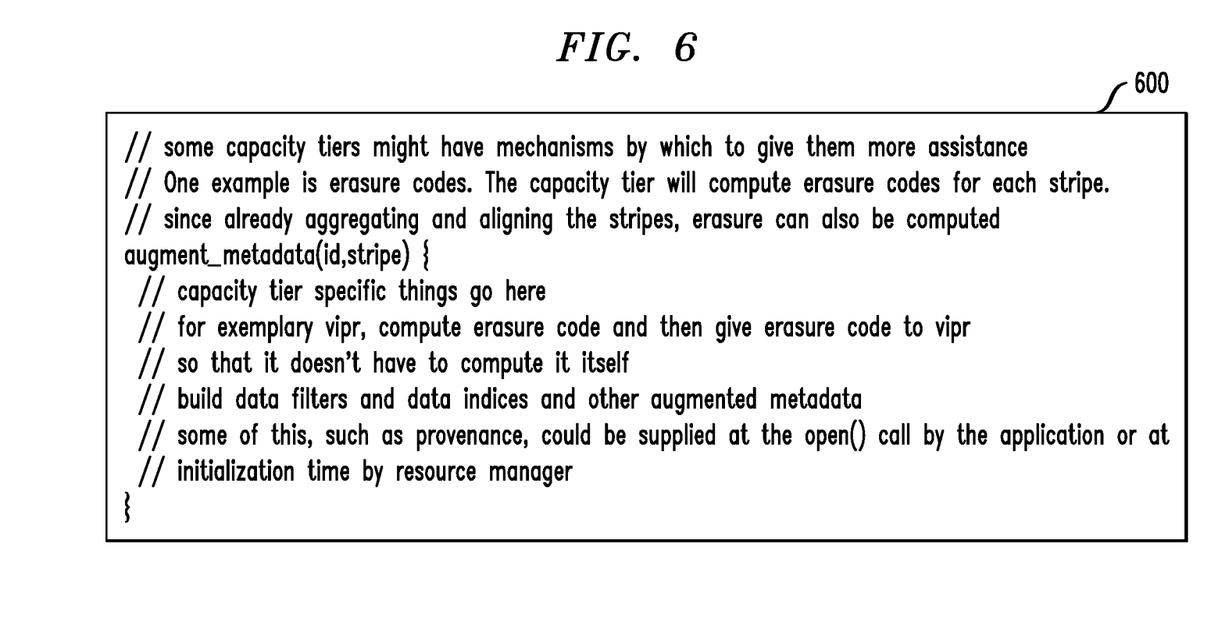

FIG. 6 illustrates exemplary pseudo code 600 for the augment_metadata function of FIG. 5B. As noted in FIG. 6, some capacity tiers 250 might have mechanisms by which the performance tier 240 can give them additional assistance. For example, the burst buffer appliance 220 in the performance tier 240 can compute erasure codes for the capacity tier 250. The capacity tier 250 might require erasure codes for each stripe. Thus, since the burst buffer appliances 220 are already aggregating and aligning the stripes, the burst buffer appliances 220 can compute the erasure codes for each stripe.

As shown in FIG. 6, the exemplary pseudo code 600 comprises code that is specific to each capacity tier 250. For the exemplary ViPR capacity tier 250, the exemplary pseudo code 600 computes erasure codes in the performance tier 240 and gives the computed erasure codes to the exemplary ViPR capacity tier 250 for storage. The exemplary pseudo code 600 can also build data filters and data indices and other augmented metadata.

Figure 7:
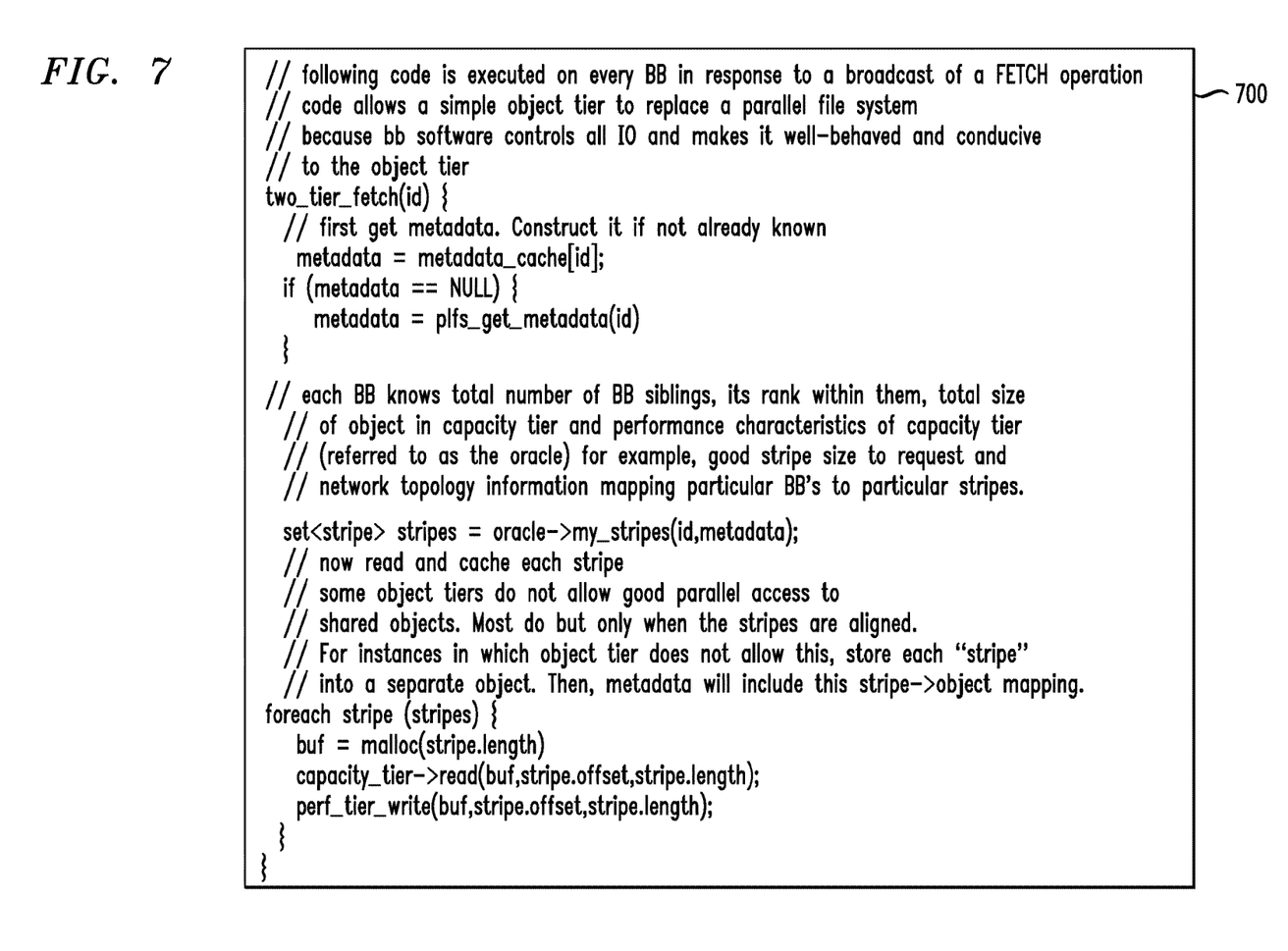

FIG. 7 illustrates exemplary pseudo code 700 for a two-tier fetch operation in accordance with the present invention. As shown in FIG. 7, the exemplary pseudo code 700 is executed on every burst buffer appliance 220 in response to a broadcast fetch operation. The exemplary pseudo code 700 allows a capacity tier 250 embodied as an object tier to replace a parallel file system, since the software executed by the burst buffer appliances 220 controls the input-output operations and makes the workload W3 well-behaved and conducive to the capacity tier 250.

As shown in FIG. 7, the exemplary pseudo code 700 initially obtains the metadata (constructing the metadata, if necessary). Each burst buffer appliance 220 knows the total number of sibling burst buffer appliances 220, its own rank within them, the total size of the object in the capacity tier 250, as well as the performance characteristics of the capacity tier 250, referred to herein as the oracle of the capacity tier 250. For example, the oracle of the capacity tier 250 may indicate a good stripe size to request and network topology information that maps particular burst buffer appliances 220 to particular stripes.

As shown in FIG. 7, the exemplary pseudo code 700 reads and caches each stripe using the oracle information. It is noted that some object tiers do not allow good parallel access to shared objects, although most object tiers do allow good parallel access to shared objects when the stripes are aligned. For instances in which the object tier does not allow this, each "stripe" is stored by the exemplary pseudo code 700 into a separate object. Then, the metadata is updated to include this stripe→object mapping.

The stripe and associated metadata is then read from the capacity tier 250 and written to the performance tier 240.

CONCLUSION

It is to be appreciated that the particular operations and associated messaging illustrated in FIGS. 3 through 7 are exemplary only, and numerous other types of operations and messaging may be used in other embodiments.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the parallel computing system 100 and/or 200. Such components can communicate with other elements of the parallel computing system 100 and/or 200 over any type of network or other communication media.

As indicated previously, components of a multi-tier storage system as disclosed herein can be implemented at least in part in the form of one or more software programs stored in memory and executed by a processor of a processing device. A memory having such program code embodied therein is an example of what is more generally referred to herein as a "computer program product."

The computing systems 100 and 200 or portions thereof may be implemented using one or more processing platforms each comprising a plurality of processing devices. Each such processing device may comprise a processor, a memory and network interface components of the type described for burst buffer appliances 220 in FIG. 2.

As indicated above, two-tier functionality such as that described in conjunction with FIGS. 3 through 7 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of parallel computing systems and associated clients, servers and other processing and storage devices that can benefit from the multi-tier functionality as described herein. Also, the particular configurations of system and device elements shown in FIGS. 1 and 2 can be varied in other embodiments. Moreover, the various assumptions

What is claimed is:

1. A multi-tier storage system, comprising:
at least first and second storage tiers comprising respective disjoint subsets of storage for storing data from at least one compute cluster comprised of a plurality of compute nodes, wherein said first storage tier comprises at least one burst buffer appliance, wherein said at least one burst buffer appliance comprises a memory for storing data and at least one processing device to transform at least a portion of said data for storage on said second storage tier based on a mapping of a plurality of said burst buffer appliances to at least one corresponding stripe on said second storage tier, wherein the transformation of the data by the at least one processing device of the at least one burst buffer reorganizes an input-output workload into a network stream having an improved alignment, relative to an alignment prior to said transformation, for transferring said data in parallel from said first storage tier to corresponding objects in said second storage tier.

2. The multi-tier storage system of claim 1, wherein the data comprises one or more of bursty data and checkpoint data.

3. The multi-tier storage system of claim 1, wherein the at least one processing device is further configured to perform at least one function on said at least said portion of said data on behalf of said second storage tier.

4. The multi-tier storage system of claim 3, wherein the at least one function comprises one or more of computing an erasure code, computing augmented metadata, a data content indexing function, a data deduplication function and a data parity function.

5. The multi-tier storage system of claim 1, wherein one or more performance characteristics of said second storage tier are obtained one or more of (i) by a distributed application and (ii) at an initialization time from a resource manager.

6. The multi-tier storage system of claim 1, wherein the at least one burst buffer appliance is further configured to obtain one or more additional portions of a stripe from one or more sibling burst buffer appliances to obtain a complete copy of said stripe.

7. The multi-tier storage system of claim 1, wherein one or more performance characteristics of said second storage tier indicate a stripe size of said second storage tier to request.

8. A burst buffer appliance for use in a first storage tier of a multi-tier storage system comprising at least said first storage tier and a second storage tier, said burst buffer appliance comprising:
a memory for storing data; and
at least one processing device to transform at least a portion of said data for storage on said second storage tier based on a mapping of a plurality of said burst buffer appliances to at least one corresponding stripe on said second storage tier, wherein the transformation of the data by the at least one processing device of the at least one burst buffer reorganizes an input-output workload into a network stream having an improved alignment, relative to an alignment prior to said transformation, for transferring said data in parallel from said first storage tier to corresponding objects in said second storage tier.

9. The burst buffer appliance of claim 8, wherein the data comprises one or more of bursty data and checkpoint data.

10. The burst buffer appliance of claim 8, wherein the at least one processing device is further configured to perform at least one function on said at least said portion of said data on behalf of said second storage tier.

11. The burst buffer appliance of claim 10, wherein the at least one function comprises one or more of computing an erasure code, computing augmented metadata, a data content indexing function, a data deduplication function and a data parity function.

12. The burst buffer appliance of claim 8, wherein one or more performance characteristics of said second storage tier are obtained one or more of (i) by a distributed application and (ii) at an initialization time from a resource manager.

13. The burst buffer appliance of claim 8, wherein the at least one processing device is further configured to obtain one or more additional portions of a stripe from one or more sibling burst buffer appliances to obtain a complete copy of said stripe.

14. A method performed by a burst buffer appliance in a first storage tier of a multi-tier storage system, comprising the steps of:
obtaining data in said multi-tier storage system, wherein said multi-tier storage system comprises at least said first storage tier and a second storage tier for storing said data; and
transforming at least a portion of said data for storage on said second storage tier using at least one processing device based on a mapping of a plurality of said burst buffer appliances to at least one corresponding stripe on said second storage tier, wherein the transformation of the data by the at least one processing device of the at least one burst buffer reorganizes an input-output workload into a network stream having an improved alignment, relative to an alignment prior to said transformation, for transferring said data in parallel from said first storage tier to corresponding objects in said second storage tier.

15. The method of claim 14, wherein the data comprises one or more of bursty data and checkpoint data.

16. A non-transitory machine-readable recordable storage medium, wherein one or more software programs when executed by one or more processing devices implement the steps of the method of claim 15.

17. The method of claim 14, further comprising the step of performing at least one function on said at least said portion of said data on behalf of said second storage tier.

18. The method of claim 17, wherein the at least one function comprises one or more of computing an erasure code, computing augmented metadata, a data content indexing function, a data deduplication function and a data parity function.

19. The method of claim 14, wherein one or more performance characteristics of said second storage tier are obtained one or more of (i) by a distributed application and (ii) at an initialization time from a resource manager.

20. The method of claim 14, wherein the at least one burst buffer appliance is further configured to obtain one or more additional portions of a stripe from one or more sibling burst buffer appliances to obtain a complete copy of said stripe.

* * * * *